(No Model.)

S. HILL.
SAW SWAGE.

No. 380,758. Patented Apr. 10, 1888.

Witnesses:
John Grist
H. P. Pennock

Inventor:
Samuel Hill
By Henry Grist,
Attorney.

UNITED STATES PATENT OFFICE.

SAMUEL HILL, OF OTTAWA, ONTARIO, CANADA.

SAW-SWAGE.

SPECIFICATION forming part of Letters Patent No. 380,758, dated April 10, 1888.

Application filed January 13, 1888. Serial No. 260,667. (No model.)

*To all whom it may concern:*

Figure 1:
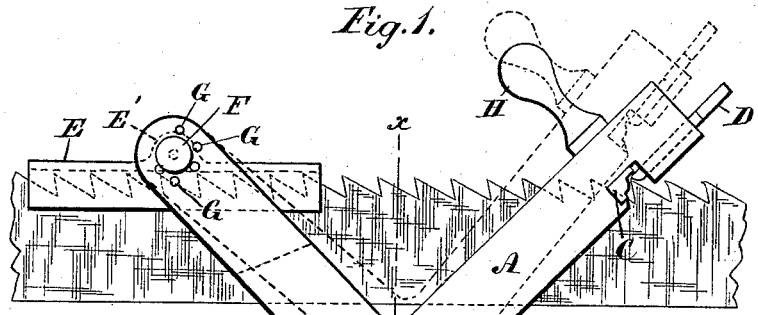
Figures 2, 3:
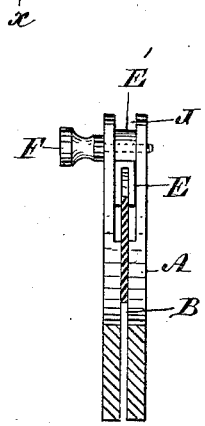

Be it known that I, SAMUEL HILL, of Ottawa, in the Province of Ontario, in the Dominion of Canada, have invented certain new and useful Improvements in Saw-Swages; and I do hereby declare that the following is a full, clear, and exact description of the same, reference being had to the accompanying drawings, in which—
Figure 1 is a side elevation of my improved saw-swage. Fig. 2 is an end elevation of the same; and Fig. 3 is a section on line $xx$, Fig. 1.

My invention has for its object to rapidly swage the teeth of band, circular, and other saws by a swage which can be quickly moved from one tooth to another and swaging effected by a punch struck by a hammer in the hand of the workman.

My invention consists of a saw-swage having a body slitted longitudinally to receive the saw, and having a punch at one end and an anvil crosswise at the foot of the punch, and the other end of the body provided with a grooved bar to bear on the teeth and adjustable to give the desired inclination to the swage, whereby the anvil will conform to the pitch of the tooth and the end of the punch shape the point when the punch is struck by a hand-hammer.

A is the body of the saw-swage, preferably elbow or arc shaped, and provided with a slit, B, to receive the saw edgewise. At the end of the slit is inserted, in a notch in the lower edge of the body A, an anvil-bar, C, grooved longitudinally to the form desired to shape the point of the tooth.

D is a punch in a socket at that end of the body above the anvil, and against the anvil the lower end of the punch impinges when the saw is removed; but when the saw is inserted in the slit for swaging the tooth bears upon the anvil and the punch will rest against the back of the tooth, so that by striking the punch with a workman's hammer the tooth will be swaged. The lower end of the punch is shaped to give the desired form to the tooth, and the punch and anvil are removable from the body to allow different-shaped punches and anvils to be interchangeably employed to suit large or small teeth.

E is a longitudinally-grooved bar, to bear on the top of the teeth of the saw and carry that end of the swage to which it is attached, whereby the swage can be readily moved from one tooth to another by the bar sliding along the top of the teeth; and said bar E is hung in a slot, J, in the end of the body opposite to the punch by a thumb-screw, F, which passes through one of a series of holes, G, and through an upwardly-projecting lug, E', integral with the bar.

The proper pitch, inclination, or set is given to the swage to suit teeth of different sizes and shapes by inserting the thumb-screw in a higher or lower hole of the series and through the lug E', when bar E is correspondingly raised or lowered by hand, and then by turning the thumb screw the bar will be clamped in the slot.

H is a handle attached to the body A near the punch end to conveniently slide the swage from tooth to tooth after the punch has been lifted out of contact with the tooth last swaged.

I claim as my invention—

A saw-swage consisting of the body A, provided with a slit, B, to receive the saw, and having at one end a punch, D, and anvil C at the end of the slit, and the other end of the body provided with holes G and thumb-screw F, and a grooved bar, E, to bear on the top of the saw-teeth, as set forth.

SAMUEL HILL.

Witnesses:
HERBERT PENNOCK,
JOHN GRIST.